(No Model.)
D. V. CARHART.
CULTIVATOR.
No. 351,357. Patented Oct. 26, 1886.
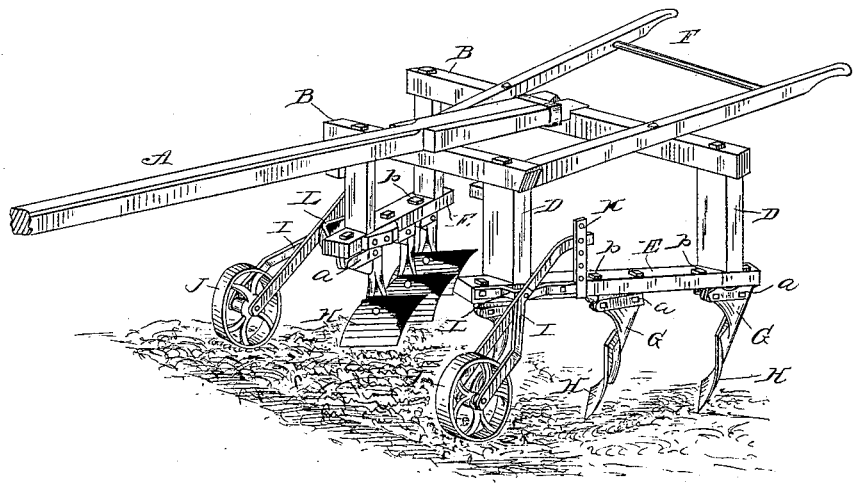
WITNESSES
Howard J. Schneider
Alfred T. Gage
INVENTOR
David V. Carhart
by Wm. T. Henderson Attorney
N. PETERS, Photo-Lithographer, Washington, D. C.

UNITED STATES PATENT OFFICE.

DAVID V. CARHART, OF HIGHTSTOWN, NEW JERSEY, ASSIGNOR OF ONE-HALF TO THOMAS PEPPLER, OF SAME PLACE.

CULTIVATOR.

SPECIFICATION forming part of Letters Patent No. 351,357, dated October 26, 1886.

Application filed April 8, 1886. Serial No. 198,179. (No model.)

*To all whom it may concern:*

Be it known that I, DAVID V. CARHART, a citizen of the United States, residing at Hightstown, in the county of Mercer and State of New Jersey, have invented certain new and useful Improvements in Cultivators or Gang-Plows; and I do hereby declare the following to be a full, clear, and exact description of the invention, such as will enable others skilled in the art to which it appertains to make and use the same.

My invention relates to cultivators or gang-plows, and has for its object to take the draft from off the necks of the horses, to regulate the depth of cut, lift the shares from contact with the ground, and to render the plow easily transportable from point to point; and to such ends the invention consists in the construction and combination of parts hereinafter particularly described and claimed.

In the drawing there is represented by the figure a perspective of the gang-plow with my attachment applied thereto.

The letter A designates the draft-pole, secured to the cross-timbers B, which are connected to the uprights D, that rest upon the beams E, the said beams, cross-timbers, and uprights constituting the frame of the plow. The handles F are connected to the frame in any suitable manner, for instance, as shown.

It will be observed that the beams E, set obliquely to the line of draft of the plow, converge from the rear to the front of the plow. To these beams are secured in any suitable manner, preferably by the castings *a* and bolts *b*, the shanks or standards G to which the shares H are bolted. These shares are set obliquely and are reversible, and can be changed in position so as to throw the soil either to or away from the plants.

The frame is provided at its forward end on both sides with levers I, pivoted to the frame and carrying at their lower ends wheels or rollers J, so that by the adjustment of said levers the frame can be raised or lowered, and the depth of cut of the shares thus regulated. The wheels support the forward part of the frame and take the draft from off the neck of the horses, so that the plow can run much lighter than when otherwise constructed. The levers are preferably bifurcated, as shown, with the wheels journaled in the forks of the bifurcation, so that the wheels will be guarded by the forks. The levers will be held at their adjustment by suitable means—for instance, by bolts passed through them and one of a series of holes formed in an upwardly-extending arm, K.

In order that the wheels may run square or parallel with the line of draft, brackets L are secured to the sides of the obliquely-set beams, so that the wheels will be brought out from the sides of the beam and thus made to set parallel with the line of draft. The upright arm K is preferably made in one piece with the bracket; but it is apparent that it can be made separate.

By pivoting the levers I to the brackets L and forming the brackets so as to bring the wheels in the line of draft the attachment can be quickly and easily applied to the beams by the most unskilled at the expenditure of little time and money.

The attachment takes the draft from off the neck of the horses, as the frame is supported on both sides by the wheels. By depressing the rear end of the levers the depth of cut is increased, and by raising them the depth is lessened, and by raising them still farther the plow can be moved from place to place without the shares cutting at all.

The simplicity and merits will be apparent to persons familiar with the gang-plow, and therefore need not be more particularly set forth.

Having described my invention and set forth its merits, what I claim is—

1. The combination, with the frame having obliquely-set beams carrying obliquely-set shares, of the bifurcated adjusting-levers, the wheels journaled in the bifurcated ends of the levers, and the brackets having the levers pivoted thereto and connecting the same with the frame parallel to the line of draft, substantially as described.

2. The lever I, provided with the wheel or roller J, in combination with the bracket L, having the lever pivoted thereto, the said bracket being constructed, substantially as shown, to hold the wheels parallel to the line of draft when applied to an obliquely-set beam, substantially as described.

In testimony whereof I affix my signature in presence of two witnesses.

DAVID V. CARHART.

Witnesses:
SAMUEL FRYER,
REDFERD J. DUNCAN.